(12) United States Patent
Hine et al.

(10) Patent No.: US 9,789,944 B2
(45) Date of Patent: *Oct. 17, 2017

(54) CABLE FOR CONNECTING A FLOAT TO A SWIMMER IN A WAVE POWERED VEHICLE

(71) Applicant: Liquid Robotics, Inc., Sunnyvale, CA (US)

(72) Inventors: Roger G. Hine, Menlo Park, CA (US); Derek L. Hine, Portola Valley, CA (US); Kurt A. F. Kiesow, III, San Jose, CA (US); William A. Stutz, San Jose, CA (US); Graham Hine, Sunnyvale, CA (US)

(73) Assignee: Liquid Robotics, Inc., Sunnyvale, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/172,860

(22) Filed: Feb. 4, 2014

(65) Prior Publication Data

US 2014/0335747 A1    Nov. 13, 2014

Related U.S. Application Data

(63) Continuation of application No. 12/449,753, filed as application No. PCT/US2008/002743 on Feb. 29, 2008, now Pat. No. 8,668,534.

(Continued)

(51) Int. Cl.
*B63H 19/02* (2006.01)
*B63B 21/66* (2006.01)
(Continued)

(52) U.S. Cl.
CPC ............ *B63H 19/02* (2013.01); *B63B 21/66* (2013.01); *F03B 13/14* (2013.01);
(Continued)

(58) Field of Classification Search
CPC .................................................. B63B 21/663
See application file for complete search history.

(56) References Cited

U.S. PATENT DOCUMENTS

| 986,627 A | 3/1911 | Fisher |
|---|---|---|
| 1,067,113 A | 7/1913 | Heyen |

(Continued)

FOREIGN PATENT DOCUMENTS

| BE | 570555 | 9/1958 |
|---|---|---|
| CN | 1132757 | 10/1996 |

(Continued)

OTHER PUBLICATIONS

Office Action for Australian Patent Application No. 2008223557 mailed Jul. 16, 2012, 5 pages.

(Continued)

*Primary Examiner* — Edwin Swinehart
(74) *Attorney, Agent, or Firm* — Gates & Cooper LLP

(57) ABSTRACT

A float (1) suitable for use as a buoy or as a component for a wave-powered vehicle. The float (1) includes an upper member (12) whose height can be changed and/or which remained substantially vertical even when the float is in wave-bearing water. A low drag cable (2) suitable for use as a tether in a wave-powered vehicle has a streamlined cross-section and includes a tensile member (21) near the front of the cross-section, at least one non-load-bearing member (22) behind the tensile member, and a polymeric jacket (23). Wave-powered vehicles having a float (1), a submerged swimmer (3) and a tether (2) connecting the float and the swimmer, include a means for determining whether the tether is twisted; or a means (91) for untwisting the tether; or a pressure-sensitive connection (71, 72, 73) which can disconnect the tether when the vehicle is dragged downwards by entanglement with a whale; or a 2-axis universal joint securing the tether to the float or to the swimmer; or (Continued)

elastic elements which absorb snap loads created by the tether; or two or more of these.

11 Claims, 3 Drawing Sheets

Related U.S. Application Data

(60) Provisional application No. 60/904,647, filed on Mar. 2, 2007.

(51) Int. Cl.
    *F03B 13/14*     (2006.01)
    *B63B 35/44*     (2006.01)

(52) U.S. Cl.
    CPC ....... *B63B 2035/4466* (2013.01); *Y02E 10/38* (2013.01); *Y02T 70/59* (2013.01)

(56) References Cited

U.S. PATENT DOCUMENTS

| | | |
|---|---|---|
| 1,315,267 A | 9/1919 | White |
| 2,170,914 A | 8/1939 | Rummier |
| 2,520,804 A | 8/1950 | Hollar |
| 2,668,512 A | 2/1954 | Klas |
| 2,868,504 A | 1/1959 | Minty |
| 2,891,501 A * | 6/1959 | Rather ............ B63B 21/663 114/243 |
| 3,012,757 A | 12/1961 | Marzolf |
| 3,132,322 A | 5/1964 | Maes |
| 3,297,814 A | 1/1967 | McClean et al. |
| 3,312,186 A | 4/1967 | Litshiem |
| 3,341,871 A | 9/1967 | Oliveau |
| 3,352,274 A | 11/1967 | Clakins |
| 3,443,020 A | 5/1969 | Loshigian |
| 3,453,981 A | 7/1969 | Gause |
| 3,508,516 A | 4/1970 | Root |
| 3,613,627 A * | 10/1971 | Kennedy ............ B63B 21/663 114/243 |
| 3,760,441 A | 9/1973 | Handelman |
| 3,828,380 A | 8/1974 | Lebovits et al. |
| 3,845,733 A | 11/1974 | Jackman |
| 3,859,949 A | 1/1975 | Toussaint et al. |
| 3,860,900 A | 1/1975 | Scudder |
| 3,872,819 A | 3/1975 | Pickens |
| 3,889,045 A | 6/1975 | Logsdon |
| 3,928,967 A | 12/1975 | Salter |
| 3,962,982 A | 6/1976 | Marchay et al. |
| 3,978,813 A | 9/1976 | Pickens et al. |
| 4,134,023 A | 1/1979 | Salter |
| 4,224,707 A | 9/1980 | Mariani |
| 4,332,571 A | 6/1982 | Jakobsen |
| 4,350,110 A * | 9/1982 | Knutson ............ H02G 1/10 114/243 |
| 4,371,347 A | 2/1983 | Jakobsen |
| 4,383,725 A | 5/1983 | Bogese et al. |
| 4,389,843 A | 6/1983 | Lamberti |
| 4,462,211 A | 7/1984 | Linderfelt |
| 4,598,547 A | 7/1986 | Danihel |
| 4,610,212 A | 9/1986 | Petrovich |
| 4,638,588 A | 1/1987 | Abadie |
| 4,673,363 A | 6/1987 | Hudson et al. |
| 4,684,350 A | 8/1987 | DeLima |
| 4,684,359 A | 8/1987 | Herrington |
| 4,726,314 A | 2/1988 | Ayers |
| 4,763,126 A | 8/1988 | Jawetz |
| 4,842,560 A | 6/1989 | Lee |
| 4,896,620 A | 1/1990 | Jones |
| 4,968,273 A | 11/1990 | Momot |
| 4,981,453 A | 1/1991 | Krishan et al. |
| 5,050,519 A | 9/1991 | Senften |
| 5,084,630 A | 1/1992 | Azimi |
| 5,273,443 A | 12/1993 | Frantz et al. |
| 5,577,942 A | 11/1996 | Juselis |
| 5,675,116 A | 10/1997 | Hillenbrand |
| 5,678,504 A | 10/1997 | Toplosky et al. |
| 5,690,014 A | 11/1997 | Larkin |
| 5,902,163 A | 5/1999 | Baruzzi et al. |
| 6,099,368 A | 8/2000 | Gorshkov |
| 6,194,815 B1 | 2/2001 | Carroll |
| 6,260,501 B1 | 7/2001 | Agnew |
| 6,285,807 B1 | 9/2001 | Walt et al. |
| 6,408,792 B1 | 6/2002 | Markels |
| 6,561,856 B1 | 5/2003 | Gorshkov |
| 6,665,189 B1 | 12/2003 | Lebo |
| 6,756,695 B2 | 6/2004 | Hibbs et al. |
| 6,814,633 B1 | 11/2004 | Huang |
| 6,908,229 B2 | 6/2005 | Landrieve et al. |
| 6,980,228 B1 | 12/2005 | Harper |
| 7,350,475 B2 | 4/2008 | Borgwarth et al. |
| 7,371,136 B2 | 5/2008 | Hine et al. |
| D578,463 S | 10/2008 | Treaud et al. |
| 7,472,866 B2 | 1/2009 | Heaston et al. |
| 7,641,524 B2 | 1/2010 | Hine et al. |
| 7,955,148 B2 | 6/2011 | Corradini |
| 8,043,133 B2 | 10/2011 | Hine et al. |
| 8,205,570 B1 | 6/2012 | Tureaud et al. |
| 8,668,534 B2 | 3/2014 | Hine et al. |
| 8,764,498 B2 | 7/2014 | Hine et al. |
| 8,808,041 B2 | 8/2014 | Hine et al. |
| 8,825,241 B2 | 9/2014 | Hine et al. |
| 8,944,866 B2 | 2/2015 | Hine et al. |
| 9,051,037 B2 | 6/2015 | Hine et al. |
| 2002/0178990 A1 | 12/2002 | McBride et al. |
| 2003/0009286 A1 | 1/2003 | Shibusawa et al. |
| 2003/0174206 A1 | 9/2003 | Moroz |
| 2003/0220027 A1 | 11/2003 | Gorshkov |
| 2004/0102107 A1 | 5/2004 | Gorshkov |
| 2004/0217597 A1 | 11/2004 | Carroll et al. |
| 2006/0213167 A1 | 9/2006 | Koselka |
| 2007/0051292 A1 | 3/2007 | Kilbourn et al. |
| 2007/0173141 A1 | 7/2007 | Hine et al. |
| 2008/0188150 A1 | 8/2008 | Hine et al. |
| 2008/0294309 A1 | 11/2008 | Kaprielian |
| 2008/0299843 A1 | 12/2008 | Hine et al. |
| 2009/0107388 A1 | 4/2009 | Crowell |
| 2009/0193715 A1 | 8/2009 | Wilcox |
| 2009/0218984 A1 | 9/2009 | Parakulam |
| 2009/0308299 A1 | 12/2009 | Luccioni et al. |
| 2009/0311925 A1 | 12/2009 | Hine et al. |
| 2010/0268390 A1 | 10/2010 | Anderson |
| 2011/0059638 A1 | 3/2011 | Sandwith |
| 2011/0174210 A1 | 7/2011 | Craig |
| 2011/0192338 A1 | 8/2011 | Goudeau |
| 2012/0029696 A1 | 2/2012 | Ota |
| 2012/0029718 A1 | 2/2012 | Davis |
| 2012/0069702 A1 | 3/2012 | Muyzert et al. |
| 2012/0094556 A1 | 4/2012 | Hine et al. |
| 2012/0295499 A1 | 11/2012 | Hine |
| 2013/0068153 A1 | 3/2013 | Hine |
| 2013/0102207 A1 | 4/2013 | Hine et al. |
| 2014/0038477 A1 | 2/2014 | Hine et al. |
| 2014/0263851 A1 | 9/2014 | Hine et al. |
| 2014/0283726 A1 | 9/2014 | Ong et al. |
| 2014/0284998 A1 | 9/2014 | Brennan et al. |
| 2014/0290233 A1 | 10/2014 | Hine et al. |

FOREIGN PATENT DOCUMENTS

| | | |
|---|---|---|
| CN | 1280936 | 1/2001 |
| CN | 2689229 | 3/2005 |
| CN | 1715136 | 1/2006 |
| DE | 10141805 | 5/2002 |
| DE | 10300599 | 7/2004 |
| DE | 102007053037 | 5/2009 |
| DE | 202008013757 U1 | 3/2010 |
| EP | 1369013 | 12/2003 |
| FR | 1159028 | 6/1958 |
| FR | 2669886 | 6/1992 |
| GB | 2461792 | 1/2010 |
| JP | S55-051697 | 4/1970 |
| JP | S55-152698 | 11/1980 |

(56) References Cited

FOREIGN PATENT DOCUMENTS

| | | |
|---|---|---|
| JP | S61-057488 | 3/1986 |
| JP | S61-146498 U | 9/1986 |
| JP | S63-149289 | 6/1988 |
| JP | S64-050199 | 3/1989 |
| TW | 221588 | 3/1994 |
| TW | 547434 | 7/2003 |
| WO | 87/04401 | 7/1987 |
| WO | 94/10029 | 5/1994 |
| WO | 98/39205 | 9/1998 |
| WO | 98/46065 | 10/1998 |
| WO | 01/42992 | 6/2001 |
| WO | 2007/087197 | 8/2007 |
| WO | 2008/109002 | 9/2008 |
| WO | 2013/077931 | 5/2013 |

OTHER PUBLICATIONS

Office Action for Australian Patent Application No. 2012211463 mailed May 21, 2013, 3 pages.
Final Office Action for U.S. Appl. No. 13/424,170, mailed Mar. 20, 2015, 13 pages.
Office Action for European Patent Application No. 12740770.8, mailed Mar. 23, 2015, 8 pages.
Non-Final Office Action for U.S. Appl. No. 13/646,737, mailed Mar. 15, 2013, 7 pages.
Non-Final Office Action for U.S. Appl. No. 13/424,156, mailed Apr. 5, 2013, 10 pages.
Non-Final Office Action for U.S. Appl. No. 13/424,239, mailed Apr. 25, 2013, 19 pages.
International Preliminary Report on Patentability for PCT Application No. PCT/US2012/029703 mailed Sep. 26, 2013, 9 pages.
International Preliminary Report on Patentability for PCT Application No. PCT/US2012/029696 mailed Sep. 26, 2013, 13 pages.
International Preliminary Report on Patentability for PCT Application No. PCT/US2012/029718 mailed Sep. 26, 2013, 13 pages.
Final Office Action for U.S. Appl. No. 13/424,156, mailed Dec. 16, 2013, 9 pages.
Notice of Allowance for U.S. Appl. No. 13/424,239, mailed Feb. 10, 2014, 11 pages.
International Preliminary Report on Patentability for PCT Application No. PCT/US2012/055797 mailed Mar. 27, 2014, 6 pages.
Notice of Allowance for U.S. Appl. No. 13/424,156, mailed Mar. 31, 2014, 18 pages.
Office Action for Canadian Patent Application No. 2,679,565 mailed Apr. 7, 2014, 3 pages.
Non-Final Office Action for U.S. Appl. No. 13/621,803, mailed Apr. 24, 2014, 7 pages.
Notice of Allowance for U.S. Appl. No. 13/536,935, mailed May 30, 2014, 7 pages.
Non-Final Office Action for U.S. Appl. No. 13/753,377, mailed Jun. 24, 2014, 6 pages.
International Search Report and Written Opinion for PCT Application No. PCT/US2014/020853 mailed Jul. 1, 2014, 11 pages.
Office Action for Australian Patent Application No. 2012275286 mailed Aug. 22, 2014, 6 pages.
Notice of Allowance for U.S. Appl. No. 13/621,803, mailed Sep. 23, 2014, 5 pages.
Office Action for Australian Patent Application No. 2012327253 mailed Sep. 23, 2014, 5 pages.
Office Action for Australian Patent Application No. 2012228956 mailed Sep. 25, 2014, 3 pages.
Non-Final Office Action for U.S. Appl. No. 13/424,170, mailed Oct. 2, 2014, 29 pages.
International Search Report and Written Opinion for PCT Application No. PCT/US2014/030396 mailed Oct. 14, 2014, 17 pages.
Office Action for Australian Patent Application No. 2012228951 mailed Nov. 17, 2014, 4 pages.
Notice of Allowance for U.S. Appl. No. 13/753,377, mailed Nov. 24, 2014, 7 pages.
Office Action for Australian Patent Application No. 2012228948 mailed Nov. 27, 2014, 3 pages.
International Preliminary Report on Patentability for International PCT Application No. PCT/US2012/044729, mailed Jan. 16, 2014, 7 pages.
Office Action for Israeli Patent Application No. 215129 mailed Dec. 10, 2014, 3 pages.
Notice of Allowance for U.S. Appl. No. 13/753,377, mailed Feb. 4, 2015, 7 pages.
"ONR/MTS Buoy Workshop 2006: Persistent Unmanned Autonomous Buoy," Department of the Navy, 21 pages (2006).
"Persistent Ocean Surveillance Station-Keeping," Defense Advanced Research Projects Agency (DARPA) Strategic Technology Office (STO), 1 page (2005).
"Persistent Ocean Surveillance, Station-Keeping Buoys: Program Overview," Defense Advanced Research Projects Agency (DARPA) Strategic Technology Office (STO), 19 pages (2004).
Ageev, "Application of Solar and Wave Energies for Long-Range Autonomous Underwater Vehicles," Advanced Robotics 16(1): 43-55 (2002).
Anderson et al., "Towards a Comprehensive Regional Acoustic Study for Marine Mammal Distribution and Activity Regulation," A Liquid Robotics White Paper, 12 pages (2012).
Clement et al., "Wave Energy in Europe: Current Status and Perspectives," Renewable and Sustainable Energy Reviews 6(5): 405-431 (2002).
Jones et al., "Engineering a Large Sustainable World Fishery," Environmental Conservation 24(2): 99-104 (1997).
Lenton et al., "The Radiative Forcing Potential of Different Climate Geoengineering Options," Atmospheric Chemistry and Physics Discussions 9: 2559-2608 (2009).
Liquid Robotics brochure, retrieved from http://liquid.com/resources/press-hik.html, 48 pages (2011).
Martin et al., "Iron Deficiency Limits Phytoplankton Growth in the North-East Pacific Subarctic," Nature 331 (6154): 341-343 (1988).
Martin, "Glacial-Integral CO2 Change: The Iron Hypothesis," Paleoceanography 5(1): 1-13 (1990).
Masters, "Liquid Robotics Ocean Robots Embark on World Record Journey Across Pacific Ocean to Foster New Scientific Discoveries," Liquid Robotics press release, 2 pages (2011).
Olson, "Communications Architecture of the Liquid Robotics Wave Glider," 5 pages.
Olson, "Communications Architecture of the Liquid Robotics Wave Glider," presented at the Navigation Guidance and Control of Underwater Vehicles Conference, 5 pages (2012).
Phelps, "Wave-Powered Motor Propels Model Boat," Popular Mechanics 91(8): 182-183 (1949).
Rainville, "Wirewalker: An Autonomous Wave-Powered Vertical Profiler," Journal of Atmospheric and Oceanic Technology 18(6): 1048-1051 (2001).
Shaw, "The Autonaut," The American Monthly Review of Reviews 19, 2 pages (1899).
Solmon et al., "Irreversible Climate Change due to Carbon Dioxide Emission," Proceedings of the National Academy of Sciences 106(6): 1704-1709 (2009).
Sparks, "Persistent UnManned Autonomous Buoy (PUMA)," Office of Naval Research (ONR) and Marine Technology Society (MTS) Buoy Workshop, SeaLandAire Technologies, Inc., 26 pages (2006).
Wilcox et al., "An Autonomous Mobile Platform for Underway Surface Carbon Measurements in Open-Ocean and Coastal Waters," Oceans 2009, Marine Technology Society (MTS) and Institute of Electrical and Electronics Engineers (IEEE), pp. 1-8 (2009).
International Search Report and Written Opinion for PCT Application No. PCT/US2008/002743 mailed Sep. 2, 2008.
Office Action for Chinese Patent Application No. 200880006903 mailed Aug. 24, 2011.
Office Action for Japanese Patent Application No. 2008-551327 mailed Oct. 18, 2011.
International Search Report and Written Opinion for PCT Application No. PCT/US2012/029703 mailed Oct. 17, 2012.
International Search Report and Written Opinion for PCT Application No. PCT/US2012/044729 mailed Oct. 17, 2012.

(56) References Cited

OTHER PUBLICATIONS

International Search Report and Written Opinion for PCT Application No. PCT/US2012/029718 mailed Dec. 21, 2012.
Extended European Search Report and Opinion for EPO Application No. 08726305 mailed Jan. 15, 2013.
International Search Report and Written Opinion for PCT Application No. PCT/US2012/029696 mailed Apr. 4, 2013.
International Search Report and Written Opinion for PCT Application No. PCT/US2012/055797 mailed May 28, 2013.
Australian Examination Report dated May 8, 2017 for Australian Application No. 2016204721.

* cited by examiner

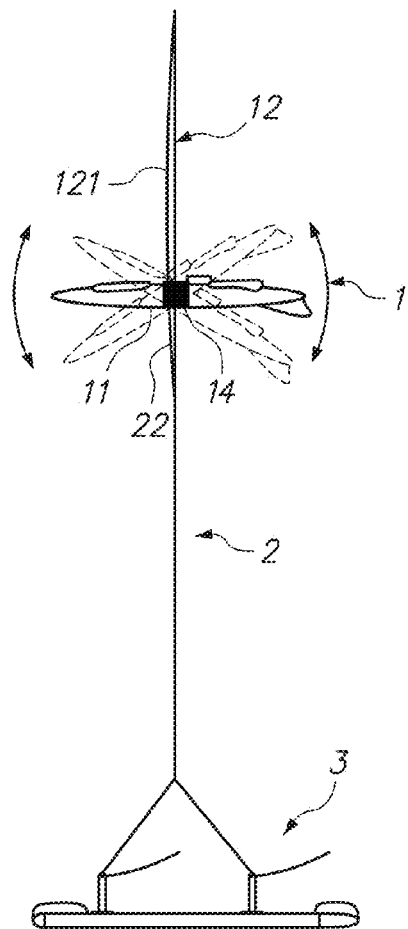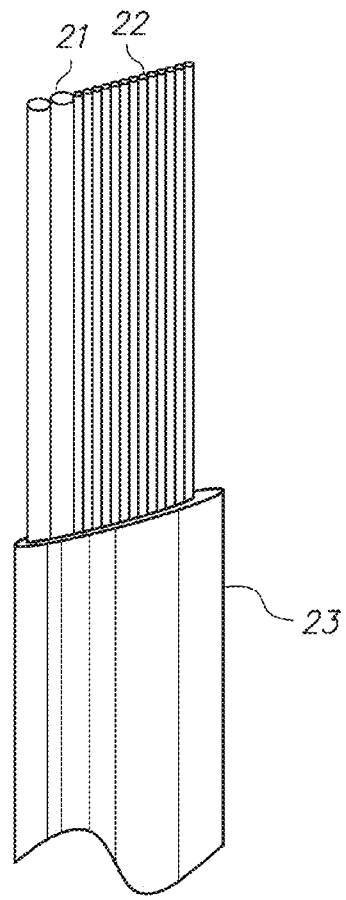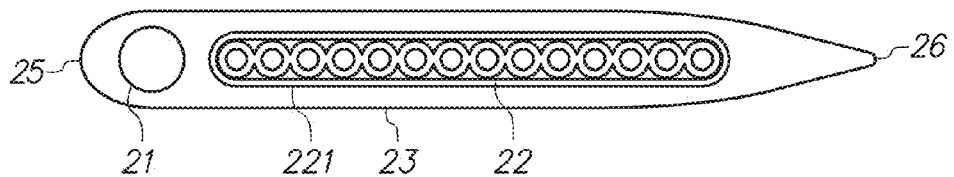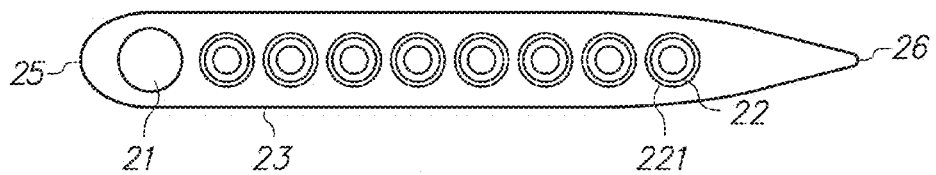
FIG. 1
FIG. 4
FIG. 2
FIG. 3

CABLE FOR CONNECTING A FLOAT TO A SWIMMER IN A WAVE POWERED VEHICLE

CROSS REFERENCE TO RELATED APPLICATIONS

This application is a continuation of U.S. patent application Ser. No. 12/449,753, filed Mar. 9, 2010, now U.S. Pat. No. 8,668,534, issued Mar. 11, 2014, for "Wave Power" (inventors Roger G. Hine, Derek L. Hine, Kurt A. F. Kiesow, William A. Stutz, and Graham Hine), which is a U.S. national phase entry lodged Feb. 29, 2008, under 35 U.S.C. §371 based on PCT Application No. PCT/US2008/002743, which claims priority from U.S. Provisional Patent Application No. 60/904,647, filed Mar. 2, 2007 for "Water Vehicle" (inventors Roger G. Hine, Derek L. Hine, Kurt A. F. Kiesow, William A. Stutz, Graham Hine).

This application is related to U.S. patent application Ser. No. 12/087,961, filed Feb. 2, 2009 for "Wave Power" (inventors Roger G. Hine, Derek L. Hine, Joseph D. Rizzi, Kurt A. F. Kiesow, Robert Burcham, and William A. Stutz), now U.S. Pat. No. 8,043,133, which is a national phase entry lodged Jul. 18, 2008, under 35 U.S.C. §371 based on PCT Patent Application No. PCT/US2007/001139, filed Jan. 18, 2007 for "Wave Power" (inventors Roger G. Hine, Joseph D. Rizzi, Kurt A. F. Kiesow, Robert Burcham, and William A. Stutz).

PCT Patent Application No. PCT/US2007/001139 claims priority from the following U.S. patent applications:

- U.S. Provisional Patent Application No. 60/841,834, filed Sep. 1, 2006 for "Water Vehicle";
- U.S. patent application Ser. No. 11/436,447, filed May 18, 2006 for "Wave Power," now U.S. Pat. No. 7,371,136, which claims priority from U.S. Provisional Patent Application No. 60/760,893, filed Jan. 20, 2006; and
- U.S. Provisional Patent Application No. 60/760,893, filed Jan. 20, 2006 for "Wave Power."

The entire disclosures of all the above mentioned applications are hereby incorporated by reference for all purposes.

BACKGROUND OF THE INVENTION

This invention relates to devices which are subject to waves in the water, and which in some cases utilize the power of waves in water.

As a wave travels along the surface of water, it produces vertical motion, but no net horizontal motion, of water. The amplitude of the vertical motion decreases logarithmically with depth; at a depth of about half the wave length, there is little vertical motion. The speed of currents induced by wind also decreases sharply with depth. A number of proposals have been made to utilize wave power to do useful work. Reference may be made, for example, to U.S. Pat. Nos. 986,627, 1,315,267, 2,520,804, 3,312,186, 3,453,981, 3,508,516, 3,845,733, 3,872,819, 3,928,967, 4,332,571, 4,371,347, 4,389,843, 4,598,547, 4,684,350, 4,842,560, 4,968,273, 5,084,630, 5,577,942, 6,099,368 and 6,561,856, U.S. Patent Publication Nos. 2003/0220027 and 2004/0102107, and International Publication Nos. WO 94/10029 and WO 87/04401. The entire disclosure of each of those patents and publications is incorporated herein by reference for all purposes.

SUMMARY OF THE INVENTION

This invention relates to devices which are subject to waves in the water, including but not limited to devices which utilize the power of waves in water, for example water vehicles which travel over the surface of the water when placed in wave-bearing water (i.e., water having waves moving across its surface). Such vehicles can for example comprise (1) a float, (2) a swimmer, and (3) a tether connecting the float and the swimmer; the float, swimmer and tether being such that, when the vehicle is in still water, (i) the float is on or near the surface of the water, (ii) the swimmer is submerged below the float, and (iii) the tether is under tension; and the swimmer, when the vehicle is in wave-bearing water, interacting with the water to generate forces which tend to move the float in a direction having a horizontal component (hereinafter referred to simply as "in a horizontal direction" or "horizontally"). In the interest of brevity, this specification refers to a water vehicle comprising a float, a swimmer and a tether as described in the previous sentence as a WPV. Preferred WPVs are described in the related applications incorporated by reference.

Summary of a First Preferred Aspect of the Invention

In a first preferred aspect, this invention provides a float which will float in water and which comprises (1) a body, (2) an upper member which is secured to the body and extends upwards from the body, and (3) means for controlling at least one of (a) the orientation of the upper member relative to the body and (b) the configuration of the upper member.

In a first embodiment of the float, (a) when the float is floating in still water, the upper member has a rest orientation relative to the water, and (b) when the float is floating in wave-bearing water, said means reduces (including substantially prevents) movement of the upper member away from the rest orientation.

In a second embodiment of the float (which can, but does not necessarily, have the features of first embodiment) the upper member has a height which can be changed (for example comprises components which can telescope into each other, and/or comprises one or more components which can fold and unfold).

Summary of the Second Preferred Aspect of the Invention

In a second preferred aspect, this invention provides a cable which (a) has a cross-section which (i) has a chord length which is 0.5 to 3.0 inch, and (ii) comprises a leading edge portion and a tapered trailing edge portion, the leading edge portion including the part of the cross-section which has the greatest width, the greatest width being 0.1 to 1.0 inch and at most 0.5 times the chord length of the cross-section, and (b) comprises (1) an elongate tensile member which carries load when the cable is under tension and which preferably passes through the leading edge portion of the cable, and (2) at least one additional elongate member which does not carry load when the cable is under tension, and (3) a jacket which provides the outer surface of the cable.

Summary of a Third Preferred Aspect of the Invention

In a third preferred aspect, this invention provides a WPV which comprises means for determining whether the tether is twisted.

Summary of a Fourth Preferred Aspect of the Invention

In a fourth preferred aspect, this invention provides a WPV which comprises means for untwisting the tether when the tether is twisted.

Summary of a Fifth Preferred Aspect of the Invention

In a fifth preferred aspect, this invention provides a WPV which comprises a pressure-sensitive connection which causes the tether to separate from float and/or from the swimmer, and/or causes the tether to break, when the water pressure substantially exceeds the water pressure under normal conditions of use. In this way, if the WPV becomes entangled with a whale or other sea creature, the WPV will be disentangled when the creature dives.

Summary of a Sixth Preferred Aspect of the Invention

In a sixth preferred aspect, this invention provides a WPV in which the tether is secured to the float and/or to the swimmer through a two-axis universal joint which pivots when the float/swimmer pitches or rolls but does not pivot when the float/swimmer yaws.

Summary of a Seventh Preferred Aspect of the Invention

In a seven preferred aspect, this invention provides a WPV wherein the tether is connected to the float or to the swimmer or to both through elastic elements which can absorb snap loads created when the tether is converted from a slack state to a load-bearing state.

BRIEF DESCRIPTION OF THE DRAWINGS

The invention is illustrated in the accompanying drawings, which are diagrammatic in nature and not to scale, and in which FIG. 1 is a diagrammatic illustration, not to scale, of a WPV incorporating the first preferred aspect of the invention;

FIGS. 2 and 3 are cross-sections through cables according to the second preferred aspect of the invention;

FIGS. 4 and 5 are perspective views of cables according to the second preferred aspect of the invention;

DETAILED DESCRIPTION OF THE INVENTION

Figure 5:
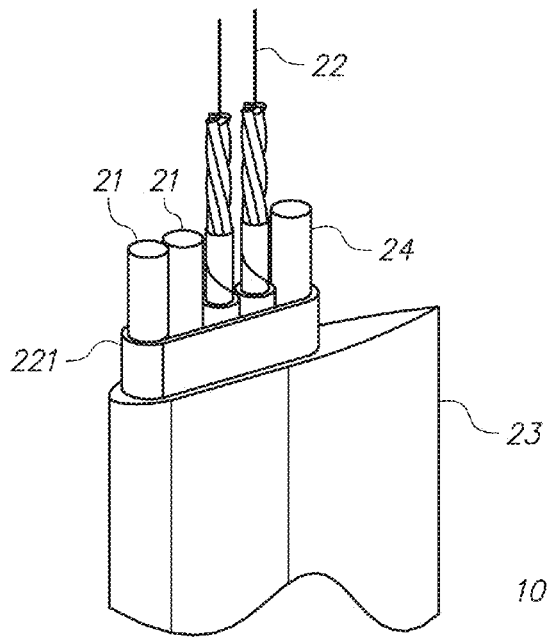

In the Summary of the Invention above, the Detailed Description of the Invention, the Examples, and the claims below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. The invention disclosed includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention.

The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When a range is given as "(a first number) to (a second number)" or "(a first number)–(a second number)", this means a range whose lower limit is the first number and whose upper limit is the second number. For example, "from 8 to 20 carbon atoms" or "8-20 carbon atoms" means a range whose lower limit is 8 carbon atoms, and whose upper limit is 20 carbon atoms. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "first" and "second" features, this is generally done for identification purposes; unless the context requires otherwise, the first and second features can be the same or different, and reference to a first feature does not mean that a second feature is necessarily present (though it may be present).

Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

This specification incorporates by reference all documents referred to herein and all documents filed concurrently with this specification or filed previously in connection with this application, including but not limited to such documents which are open to public inspection with this specification.

A. Detailed Description of the First Aspect of the Invention

In its first aspect, the invention provides a float which can be used for any purpose, including for example as a buoy (or part of a buoy) or as part of a WPV. The term "orientation" denotes the angular relationship between the body and the upper member. The term "configuration" denotes the dimensions (e.g., height and/or width) of the upper member, and includes the presence or absence of auxiliary members, e.g., sensors.

Referring now to the drawings, FIG. 1 shows a WPV incorporating the first aspect of the invention. The WPV is made up of a float 1, a tether or cable 2 and a swimmer 3. The float comprises a body 11 and a pole 12 which passes through the body 11 and is secured to it by a pivot joint 14. The pole 12 thus provides an upper member 121 and a lower member 122. Phantom lines show the outline of the float as it pitches as a result of wave motion. The pole 12, however, does not follow the pitching of the float. The swimmer is shown directly below the float, with the tether vertical. In practice, the swimmer will tend to be forward of the float, and if it is desired to keep the upper member vertical, the bottom member may angle forward from the upper member by an appropriate angle, for example about 5°.

The float can optionally have one or more of the following characteristics, denoted A1 . . . A7:

A1. (a) When the float is floating in still water, the upper member has a rest orientation relative to the water; and (b) when the float is floating in wave-bearing water, the controlling means reduces movement of the upper member away from the orientation position.

A2. (a) The upper member is secured to the body so that it can be rotated relative to the body, e.g., by means of a pivot joint which allows pitch motion and/or roll motion, or by a gimbal joint such as a ball and socket (a pivot joint which allows only pitch motion may be adequate when the float is relatively long and narrow); and (b) the controlling means comprises a lower member which (i) is secured to the body, (ii) extends downwards from the body, (iii) is linked to the upper member, and (iv) when the float is in wave-bearing water, causes rotation of the upper member relative to the body when the float is in water and is subject to wave motion.

A3. The lower member can for example have one or more of the following characteristics:

A3a It is secured to the upper member so that, when the float pitches, the lower member reduces the movement of the upper member away from the rest orientation. Alternatively or additionally, it is secured to the upper member so that, when the float rolls, the lower member reduces the movement of the upper member away from the rest orientation; this feature is particularly appropriate when the float has two or more hulls, e.g., is a catamaran, in which case the upper member will generally be placed between the hulls.

A3b It has a weight and/or moment of inertia which is substantially greater than the weight and/or moment of inertia of the upper member. For this purpose, a weight can optionally be secured to the lower member, preferably at its lower end, either directly or through a flexible cable. When the float as part of a WPV and the tether is secured to the lower member, the desired weight can be partly or completely supplied by the weight of the tether and the swimmer.

A3c It is secured to the upper member so that the upper and lower members form a single body (a "pole"). In one embodiment, the pole passes through a hinge socket in the float body when the float is floating in water, and can be pulled up through the hinge socket for storage when the float is not floating in water or for deployment. In another embodiment, the pole can be secured to the float at two or more different levels so that the height of the upper member can be increased, e.g., to place a sensor at a desired high level (or decreased), and the length of the lower member can be correspondingly decreased (or increased, e.g., to lower the swimmer when the tether is attached to the lower member, as may be desirable when the waves are large).

A3d when the float is in still water, it lies in a vertical plane which includes the longitudinal axis of the body of the float and/or is substantially vertical, or, when the float is used as the float in a WPV, is inclined to the vertical towards the forward end, for example at an angle of up to 12°, e.g., 3-8°, e.g., about 5°, to the vertical.

A4. The upper member can optionally have one or more of the following characteristics:

A4a It has a height or other dimension which can be changed. For example, the upper member can be telescopic (i.e., comprise two or more units which slide relative to each other and thus change a dimension of the upper member), and/or can comprise two or more units which can fold and unfold and thus change a dimension of the upper member. The float can include a motor to change a dimension of the upper member. The float can include one or more sensors which activate actuators to change a dimension of the upper member, for example sensors (which may be on the upper member) which sense the height of the waves, so that the height of the upper member can be reduced as the height of the waves increases, and vice versa. An advantage of an upper member whose height or other dimension can be changed is that its wind resistance can be minimized.

A4b It carries one or more accessories selected from the group consisting of cameras, radio antenna, radio transmitters, radio repeaters, meteorological sensors, carbon dioxide sensors, and beacons, and sensors for sensing heat and gas flux between the atmosphere and the ocean.

A4c It passes through or around the body of the float.

A4d When the float is in still water, it has an axis which lies in a vertical plane including the longitudinal axis of the float and/or is substantially vertical.

A4f It comprises one or more flexible portions so that it can bend in overload situations.

A5. It is not associated with a lower member as described above, for example is fixed to the body of the float so that its orientation does not change when the float is in wave-bearing water, or makes use of a different mechanism to control its orientation.

A6. The float has a length of 2-30 feet, e.g., 5-15 feet, and a width which is 0.1 to 0.6 times, e.g., 0.2 to 0.3 times, the length of the float.

A7. The float is the float in a WPV as hereinbefore defined. In such a WPV, the tether can be connected to the lower member, preferably to the lowest point of the lower member, or to the float body. The connection can for example be through a universal joint.

Preferred embodiments of this aspect of the invention are particularly useful in supporting sensors and other equipment at a desirable and preferably relatively constant level above the water. For example, some embodiments of this aspect of the invention reduce (including in some cases, substantially eliminate) the swaying motion of an upper member which is fixed to a float in wave-bearing water. If desired, the upper member can be maintained in a substantially vertical position. Such swaying motion distorts wind measurements and reduces the efficacy of radio communications. Many of the instruments which are conventionally mounted on data buoys and data collection water vehicles operate best at relatively high levels above the surface of the water.

The standard height for reporting wind speed is 10 m above water level, but in prior art practice wind speeds are often measured at lower levels and then corrected. When measuring wind speeds using a float according to the present invention, the measurements are preferably taken at a level at least 1.5 m above the water, and can generally be taken at substantially higher levels; if desired, the wind speeds can be corrected to take account of information provided by sensors on the float which observe the height of the waves.

For line of sight radio communications, the greater the height of the transmitter and receiver, the greater the possible range. Preferred embodiments of the present invention make it possible to create a radio communications repeater network comprising a plurality of antenna-bearing WPVs which are separated by a substantial distance, for example 10-20 miles. The number and separation of WPVs can be chosen so that there is redundancy, so that the absence of one or a small number of the WPVs does not prevent the network from operating.

Camera observations are best taken at a level above the waves and spray.

For the measurement of air/sea heat flux (which is important to climate models and meteorological models) sensors that measure temperature or carbon dioxide concentration are placed at various heights above and below the surface of the water. It has been found that carbon dioxide flux can be characterized by positioning sensors at suitable heights, e.g., about 2 m and about 4 m, above the water surface. In one embodiment of the floats of the present invention, the upper member comprises carbon dioxide sensors placed at different heights, e.g., about 2 and about 4 m, above the water surface. The float can also include a carbon dioxide sensor below the surface of the water. When the float is part of a WPV, carbon dioxide sensors can also be placed on the swimmer and/or on the tether and/or on a towed array. The towed array can be a towfish which has buoyancy controls which enable it to sweep up-and-down from the surface to a depth of 30-100 m (or even more).

The invention disclosed herein includes not only a WPV which has an upper member as disclosed above and which is fitted with carbon dioxide sensors, but also any WPV which is fitted with carbon dioxide sensors as disclosed above.

The float can include sensors (e.g., accelerometers or rate sensors such as rate-sensitive GPS) which cause equipment on the upper member to operate only when the float is at or close to a wavecrest.

Preferred embodiments of this aspect of the invention make it practical to use upper members having a height which is greater than is practical when using an upper member which is fixed to the float. For example, the upper member can optionally have a fixed height (or, if the upper member has an adjustable height, a maximum height) which is at least 0.5 times the length of the float, e.g., at least 0.8 times the length of the float, e.g., 0.8-3 times the length of the float or 1-2 times the length of float. Thus, the height can be at least 6 feet, or at least 10 feet, e.g., 6-15 feet, or even more when the height is adjustable, for example a height of 3-10 feet when fully collapsed, and a height of 10-30 feet when fully extended.

B. Detailed Description of the Second Preferred Aspect of the Invention.

The cables of the second preferred aspect of the invention are useful in a wide variety of situations in which it is useful to reduce the drag on a cable when the cable moves relative to water or other liquid in which it is immersed. In one such use, the cable is used as a tether in a WPV.

The cable can optionally have one or more of the following characteristics, denoted B1 . . . B17:

B1. It has a cross-section which has a chord length which is 0.8 to 1.5 inch.

B2. It has a greatest width which is at most 0.3 times the chord length of the cross-section.

B3. It has a cross-section which includes a tapered trailing edge section.

B4. It has a relatively rounded leading edge and sharp trailing edge such that the cross section is similar to a tear-drop or airfoil shape.

B5. The jacket is composed of a polymeric composition e.g., a composition which comprises an epoxy resin or a polyurethane.

B6. The jacket has been prepared by extruding or otherwise molding a polymeric composition around the tensile member(s) and the additional elongate member(s), preferably by a process which does not result in residual stresses in the jacket, for example by casting the composition around the elongate components, or which includes a step, after the jacket has been formed around the elongate components, in which any stresses in the jacket are reduced (including removed entirely).

B7. The jacket comprises additives which inhibit marine growth and other fouling.

B8. The additional elongate member comprises one or more of insulated electrical conductors, optical fibers and acoustic cables, e.g., an insulated ribbon cable.

B9. The cable carries identification, e.g., visible markings, which enable the cable to be inspected to determine whether it is twisted, for example by a camera on the float body.

B10. The cable further comprises fins extending from the insulating jacket at spaced-apart intervals; the fins can for example be 1-5 in.$^2$ in area, and the distance between adjacent fins can for example be 2-12 feet.

B11. The cable further comprises a second elongate tensile member which carries load when the cable is under tension and which passes through the leading edge portion of the cable.

B12. The elongate tensile member(s) is (are) surrounded by a tube which enables the tensile member(s) to move independently of the remainder of the cable, for example a tube composed of a polymeric composition comprising a fluorinated polymer, e.g., polytetrafluoroethylene. When there is more than one tensile member, there can be such a tube around each of the tensile members, or a single tube around all the tensile members. This expedient enables the tensile member(s) to stretch without stretching the other elongate components, e.g., electrical conductors. It also enables the remainder of the cable to rotate around the tensile member(s) and feather into a reduced drag orientation.

B13. The cable comprises a braided component which resists twisting, e.g., a braided sleeve surrounding some or all of the tensile member(s) and additional elongate member(s). The braided component can for example be composed of a high-strength polymeric material, e.g., Kevlar or another aramid polymer.

B14. The cable comprises a water-blocking component to prevent any water which penetrates the jacket from traveling along the cable.

B15. The tensile member is composed of stainless steel or a high-strength polymeric material, e.g., an aromatic polyester such as Vectran, for example in the form of multiple strands twisted together. In some cases it is desirable to stretch the tensile member under an appropriate load before it is made up into the cable, to ensure that it does not undergo substantial stretching in when it is used as a tether. The tensile member may have a diameter of, for example, 0.1 to 0.3 inch.

B16. The cable is used as the tether in a WPV, the cable being aligned so that its leading edge portion is oriented towards the front of the WPV, and being connected to the body of the float and to the swimmer so that the loads are carried by the tensile member.

B17. The cable is used as the tether in a WPV and is attached to the float and/or to the swimmer by aswivel joint that allows the tether to rotate relative to the float and/or swimmer.

FIG. 2 is a cross-section through a cable according to the second preferred aspect of the invention, from the leading edge 25 to the trailing edge 26. The cross section is to scale, and the chord length of the cross-section can for example be 0.8 to 1.5 inch. The cable comprises a tensile member 21, a ribbon cable 22 which is surrounded by a braided polymeric sleeve 221, and a streamlined polymeric jacket 23. The tensile member 21 can for example be a 0.09375 inch diameter 316 stainless steel wire rope, 7×7 construction. The ribbon cable 22 can for example comprise a plurality, e.g., 14, 22 AWG tinned copper wires each surrounded by fluorinated ethylene propylene (FEP) installation. The braided sleeve 221 can for example be composed of Kevlar® strands. The polymeric jacket 21 can for example be composed of a marine grade polyurethane having a Shore A 80 Durometer.

FIG. 3 is a cross-section through another cable according to the second preferred aspect of the invention. It is shown from the leading edge 25 to the trailing edge 26. The cross section is to scale, and the chord length of the cross-section can for example be 0.8 to 1.5 inch. The cable comprises a tensile member 21, a plurality, e.g., 8, of conductors 22, each surrounded by a braided stainless steel sleeve, and a streamlined polymeric jacket 23. The tensile member 21 and jacket 23 can for example be as described for FIG. 2. Each of the conductors can for example be a 20 AWG tinned copper wire.

FIG. 4 is a perspective view of another cable according to the second preferred aspect of the invention. The cable comprises two tensile members 21, a ribbon cable 22, and a polymeric jacket 23. Particularly when the tensile member is liable to stretch significantly under load, for example when it is a synthetic fiber rope, e.g., composed of Vectran, preferably each of the tensile members is surrounded by a tube of a suitable polymeric material, e.g., polytetrafluoroethylene, so that it can stretch and rotate independently of the remainder of the cable.

FIG. 5 is a perspective view of another cable according to the second preferred aspect of the invention. The cable comprises two tensile members 21, two cables 22, each containing multiple individually insulated electrical conductors, a trailing edge member 24, a braided sleeve 221 which surrounds components 21, 22 and 24, and a polymeric jacket 23. The tensile members 21 can for example be as described above. Each of the cables 22 can for example comprise four individually insulated copper alloy conductors spiraled around a synthetic fiber rope, all surrounded by a further layer of insulation and/or a braided wire shield, e.g., of copper or stainless steel. The braided sleeve 221 can for example be composed of a metal or polymeric composition, e.g., Kevlar or nylon. The trailing edge member 24 can for example a metal or synthetic fiber rope; it does not carry load, but helps to maintain the structural integrity of the cable during handling and use.

C. Detailed Description of the Third Preferred Aspect of the Invention.

The third preferred aspect of the invention is concerned with WPVs which comprise means for determining whether the tether is twisted. It is possible to design a WPV which, under most operating conditions, will not cause the tether to become twisted. However, the tether may become twisted during deployment, or in very flat calm seas, or in very violent seas. A twisted tether creates undesirable drag. It is, therefore, desirable for the WPV to comprise means for determining whether the tether is twisted. Such WPVs can optionally have one or more of the following characteristics.

C1. The tether includes at least one identifier, e.g., markings which can be identified by suitable equipment (e.g., each side having a different color, or a stripe along one side only), and the float or the swimmer or both comprise such suitable equipment, e.g., a still or video camera mounted on the float or the swimmer, which can inspect the identifier to determine whether or not the tether is twisted, and communicate the results of the inspection, e.g., via radio to an observer.

C2. The means for determining whether the tether is twisted comprises at least two compasses which are placed at vertically spaced-apart locations on the WPV. For example, one compass can be placed on the float, another compass on the swimmer, and at least one other compass somewhere along the tether (preferably not at the midpoint of the tether). In another example, only two compasses are used, one on the swimmer and the other on the float, and the compasses are monitored on an ongoing basis to keep track of the total amount of rotation relative to the Earth's magnetic field. Each compass reports a rotation to a controller, and the controller compares the two to determine if twisting has occurred. This system has the benefit of using only two compasses and placing them in locations where electronics may already be present.

C3. The float and the swimmer include equipment which detects and reports relative rotation of the float and the swimmer.

C4. The WPV can deliberately induce one or more twists, see how the speed is affected, and then continue with the number of twists which optimizes the speed, which can be assumed to be when the tether is not twisted. If the WPV includes wave characterization sensors, wind sensors, and water speed sensors so that it can determine the expected speed under the observed conditions, this procedure can be followed when the speed is less than the expected speed.

D. Detailed Description of the Fourth Preferred Aspect of the Invention.

The fourth preferred aspect of the invention is concerned with WPVs which comprise means for untwisting the tether when the tether has become twisted. Such WPVs can optionally have one or more of the following characteristics.

D1. The means for untwisting the tether comprises a motor-driven thruster on the float which can spin the float around and untwist the tether.

D2. The means for untwisting the tether comprises a retractable fin at the front of the float. The fin is normally refracted but can be deployed to create drag at the front of the float; this causes the float to rotate through 180°; the fin is then retracted, and a fin at the rear of the float causes the float to continue rotating through a further 180°.

D3. The means for untwisting the tether comprises a motor-driven rotation coupling at the junction of the tether and the float, or at the junction of the tether and the swimmer, or at an intermediate point of the tether. If the tether includes electrical wires, the rotation coupling preferably includes a break in the wires, for example as may be achieved by a sliding contact slip ring or a by device that does not maintain electrical contact throughout the rotation but does so at one point of each revolution. The motor driven rotation coupling may comprise a geared electric motor that is either in line or proximal to the rotation joint and is capable of rotating the cable relative to the float or swimmer. When the motor is not driven it may include a brake or other means to prevent the rotation joint from moving, in order to reduce wear on sliding electrical contacts.

Figure 6:
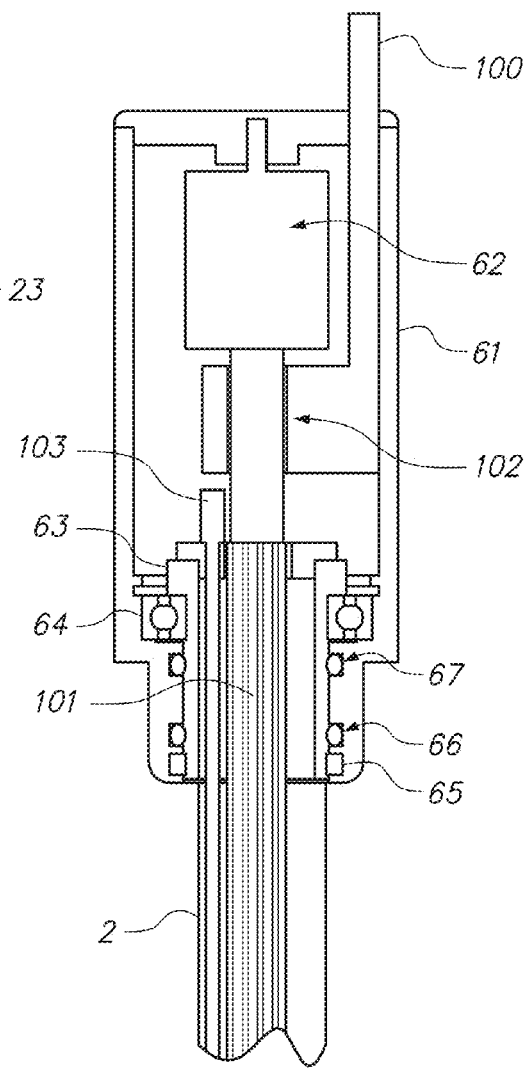
FIGS. 6 and 7 are cross-sectional and perspective views of a rotation coupling for use in the fourth preferred aspect of the invention.
Figure 7:
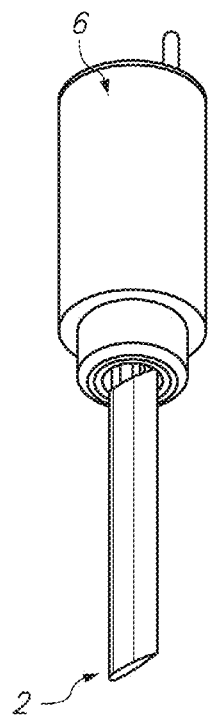

FIG. 6 is a cross-sectional view, and FIG. 7 is a perspective view of a driven rotation coupling which can be used in the fourth preferred aspect of the invention. The Figures show a tether 2 which is terminated in a driven rotation coupling 6. The electrical conductors in the tether are connected to exiting electrical wires 100 through solder joints in electrical connection area 101 which is filled with potting compound (not shown) and a sliding contact slip ring 102. The tensile member in the tether is terminated at location 103. The coupling comprises a housing 61 and a gear motor 62 whose output is fixed to the housing 61 and whose body is fixed to a center post. The coupling comprises an output hollow shaft 63, a load carrying bearing 64, a plastic bushing and primary wiper 65, a primary seal 66 and a secondary seal 67.

E. Detailed Description of the Fifth Preferred Aspect of the Invention.

The fifth preferred aspect of the invention is concerned with WPVs which comprise a pressure-sensitive connection which is triggered by excessive water pressure. Such WPVs can optionally have one or more of the following characteristics.

E1. The pressure sensitive connection comprises a piston with a radial seal inside a cylinder and encloses an air chamber. Air pressure inside the chamber and a coil spring urge the piston to extend. In the extended position the piston prevents a latch or other mechanical element from allowing the cable to release. Water pressure urges the piston to retract. In the retracted position, the piston allows the latch or other mechanical element to release.

E2. The pressure-sensitive connection is at the junction of the float and the tether.

E3. The pressure-sensitive connection comprises an eye in the tensile member of the tether, a pin which passes through the eye and which is withdrawn from the eye by the release of a spring.

E4. The pressure-sensitive connection is triggered when it is at a depth of 30 feet or more, for example at a depth of 50 feet or more, or at a selected depth which is between 30 feet and 90 feet.

Figure 8:
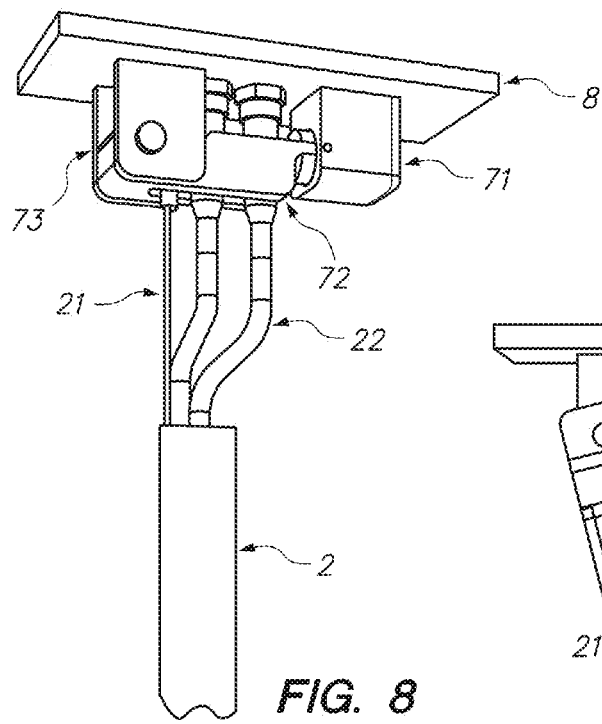
FIG. 8 is a perspective view of a cable release mechanism for use in the fifth preferred aspect of the invention.
Figure 10:
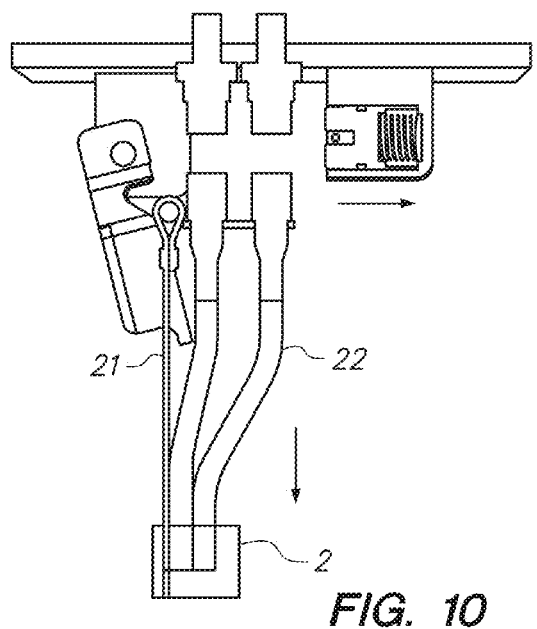
FIGS. 9 and 10 are cross-sectional views of the mechanism of FIG. 8 in the closed and open positions.
Figure 9:
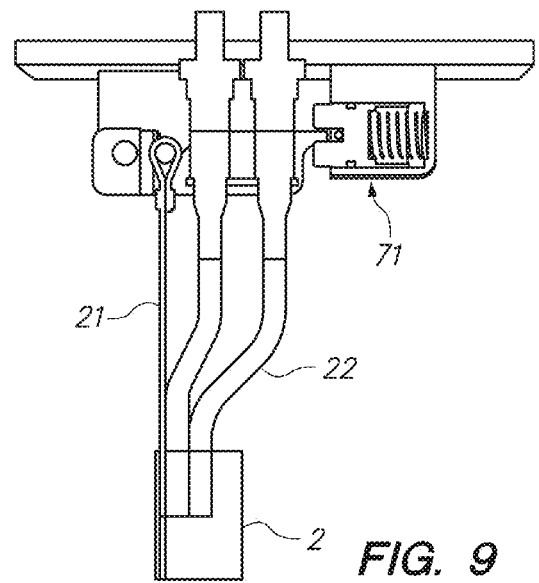

FIGS. 8-10 illustrate a pressure-sensitive connection for use in the fifth preferred aspect of the invention. The pressure-sensitive connection 7 is mounted on a baseplate 8 which is secured to the float. The connection comprises a pressure activated cylinder 71, a latch bar 72 and a hinge pin 73. The tensile member 21 of the tether is terminated with an eye and a pin. The latch bar 72 supports both the eye and the pin, and allows both to pull free when the pressure piston collapses the air chamber.

F. Detailed Description of the Sixth Preferred Aspect of the Invention.

The sixth preferred aspect of the invention is concerned with WPVs in which the tether is secured to the float and/or to the swimmer through a two-axis universal joint which pivots when the float/swimmer pitches or rolls but does not pivot when the float/swimmer yaws. This guides the tether to remain aligned with the float and thus reduces the tendency of the tether to twist. The universal joints may comprise two hinges at right angles to each other, with the tensile loads from the tether being transmitted through the hinges to the float or swimmer. Any electrical components of the tether are routed around or through the universal joint so that they do not see tensile loads and bend in a controlled manner consistent with their bending ability and fatigue strength.

G. Detailed Description of the Seventh Preferred Aspect of the Invention.

The seventh preferred aspect of the invention is concerned with WPVs in which the tether is connected to the float, or to the swimmer, or to both, through elastic elements which can absorb snap loads created when the tether is converted from a slack state to a load-bearing state.

What is claimed is:

1. A cable configured for tethering a float to a swimmer in a wave-powered vehicle (WPV), wherein the cable:
   (a) has a cross-section which
      (i) has a chord length that is 0.5 to 3.0 inch along a longitudinal axis, and
      (ii) comprises a leading edge portion and a trailing edge portion spaced along a direction parallel to the longitudinal axis and aligned so that the leading edge portion is directed towards the front of the float, the leading edge portion including the greatest width of the cross-section, the greatest width being 0.1 to 1.0 inch and at most 0.5 times the chord length of the cross-section, wherein the width of the cross-section extends in a direction parallel to a transverse axis,
   (b) comprises
      (1) an elongate tensile member that carries load when the cable is under tension,
      (2) at least one additional elongate member that does not carry load when the cable is under tension,
      (3) a jacket that provides the outer surface of the cable, and
      (4) a joint at or near the upper end of the cable that is configured for connecting the cable to the float in such a manner that the joint pivots relative to the cable about the transverse axis so that the cable is not forced to flex about the transverse axis; and
   (c) is configured for tethering the float to the swimmer in such a manner that when the vehicle is in wave-bearing water, the swimmer interacts with the water to generate forces that tend to move the float horizontally.

2. The cable of claim 1 wherein:
   the tensile member is part of the leading edge portion;
   the cross-section has a chord length which is 0.8 to 1.5 inch and a greatest width which is at most 0.5 times the chord length; and
   the trailing edge section is tapered.

3. The cable of claim 1 wherein the joint also pivots about the longitudinal axis.

4. The cable of claim 1 wherein the joint does not pivot about an axis that is perpendicular to the transverse axis and the longitudinal axis.

5. The cable of claim 1 wherein the joint also pivots about the longitudinal axis but does not pivot about an axis that is perpendicular to the transverse axis and the longitudinal axis.

6. The cable of claim 1 further comprising an additional joint at a lower end of the cable for connecting the cable to a swimmer wherein the additional joint allows the swimmer and cable to pivot relative to each other about an axis parallel to the transverse axis so that the cable is not forced to flex about an axis parallel to the transverse axis.

7. A cable configured for tethering a float to a swimmer in a wave-powered vehicle, wherein the cable:
   has a cross-section that extends farther along a longitudinal axis than along a transverse axis;
   comprises
   (1) an elongate tensile member that carries load when the cable is under tension, and
   (2) a jacket that provides the outer surface of the cable, and
   (3) a joint at or near the upper end of the cable that is configured for connecting the cable to the float in such a manner that the joint pivots relative to the cable about the transverse axis so that the cable is not forced to flex about the transverse axis; and
   is configured for tethering the float to the swimmer in such a manner that when the vehicle is in wave-bearing water, the swimmer interacts with the water to generate forces that tend to move the float horizontally.

8. The cable of claim 7 wherein the joint also pivots about the longitudinal axis.

9. The cable of claim 7 wherein the joint does not pivot about an axis that is perpendicular to the transverse axis and the longitudinal axis.

10. The cable of claim 7 wherein the joint also pivots about the longitudinal axis but does not pivot about an axis that is perpendicular to the transverse axis and the longitudinal axis.

11. The cable of claim 7, and further comprising an additional joint at a lower end of the cable for connecting the cable to a swimmer wherein the additional joint allows the swimmer and cable to pivot relative to each other around an axis parallel to the transverse axis so that the cable is not forced to flex about an axis parallel to the transverse axis.

* * * * *